(12) United States Patent
Sugiyama et al.

(10) Patent No.: US 11,633,690 B2
(45) Date of Patent: Apr. 25, 2023

(54) INFORMATION MANAGEMENT SYSTEM AND INFORMATION MANAGEMENT METHOD

(71) Applicant: TOYOTA JIDOSHA KABUSHIKI KAISHA, Toyota (JP)

(72) Inventors: Kouseki Sugiyama, Sunto-gun (JP); Daiki Yokoyama, Gotemba (JP)

(73) Assignee: TOYOTA JIDOSHA KABUSHIKI KAISHA, Toyota (JP)

(\*) Notice: Subject to any disclaimer, the term of this patent is extended or adjusted under 35 U.S.C. 154(b) by 346 days.

(21) Appl. No.: 16/888,909

(22) Filed: Jun. 1, 2020

(65) Prior Publication Data
US 2021/0001266 A1  Jan. 7, 2021

(30) Foreign Application Priority Data
Jul. 1, 2019 (JP) .............................. JP2019-122826

(51) Int. Cl.
*B01D 53/14* (2006.01)
*H04W 4/48* (2018.01)

(52) U.S. Cl.
CPC .......... *B01D 53/1475* (2013.01); *H04W 4/48* (2018.02); *B01D 2257/504* (2013.01); *B01D 2258/01* (2013.01)

(58) Field of Classification Search
CPC .......... B01D 53/1475; B01D 2257/504; B01D 2258/01; B01D 53/04; B01D 2258/06; B01D 2259/40007; B01D 53/0454; H04W 4/48; H04W 4/44; H04W 4/38; Y02C 20/40; F01N 3/0857; G08C 17/02; H04L 67/12
See application file for complete search history.

(56) References Cited

U.S. PATENT DOCUMENTS

| | | |
|---|---|---|
| 2013/0298532 A1 | 11/2013 | Hamad et al. |
| 2013/0298761 A1 | 11/2013 | Hamad |
| 2013/0333638 A1 | 12/2013 | Nishida et al. |
| 2017/0030234 A1 | 2/2017 | Hyde et al. |

FOREIGN PATENT DOCUMENTS

| | | | |
|---|---|---|---|
| DE | 10 2004 032 927 A1 | | 2/2005 |
| JP | 2005-327207 A | | 11/2005 |
| JP | 2005327207 | \* | 11/2005 |
| JP | 2014-504695 A | | 2/2014 |
| JP | 2014-509360 A | | 4/2014 |
| WO | WO 2017/202947 A2 | | 11/2017 |

\* cited by examiner

*Primary Examiner* — Kim T Nguyen
(74) *Attorney, Agent, or Firm* — Oblon, McClelland, Maier & Neustadt, L.L.P.

(57) ABSTRACT

An information management system provided with a plurality of external devices able to send and receive information and a server configured to be able to communicate with the external devices. The external devices are configured to send to the server the amounts of $CO_2$ recovery recovered by the vehicles provided with the $CO_2$ recovery devices. The server is configured to add up and manage the amounts of $CO_2$ recovery sent from the external device.

2 Claims, 9 Drawing Sheets

INFORMATION MANAGEMENT SYSTEM AND INFORMATION MANAGEMENT METHOD

FIELD

The present disclosure relates to an information management system and information management method.

BACKGROUND

Japanese Unexamined Patent Publication No. 2014-509360 discloses as a conventional vehicle a vehicle which mounts a $CO_2$ recovery device for recovering $CO_2$ (carbon dioxide) in exhaust discharged from an internal combustion engine.

SUMMARY

For example, in the case of taxi companies or other businesses (groups) operating numbers of vehicles provided with $CO_2$ recovery devices, the businesses may add up and manage the amounts of $CO_2$ recovery recovered by the vehicles operated by the businesses and use the information in operations of the businesses. However, the greater the number of vehicles operated, the easier it becomes for omissions to occur when adding up the amounts of $CO_2$ recovery and more difficult it is liable to become to accurately add up and manage the amounts of $CO_2$ recovery.

The present disclosure was made focusing on such a problem and has as its object to make it possible to accurately add up and manage the amounts of $CO_2$ recovery recovered by vehicles provided with $CO_2$ recovery devices.

To solve this problem, the information management system according to a certain aspect of the present disclosure is provided with a plurality of external devices able to send and receive information and a server configured to be able to communicate with the external devices. The external devices are configured so as to send the amounts of $CO_2$ recovery recovered by vehicles provided with $CO_2$ recovery devices to the server. The server is configured to add up and manage the amounts of $CO_2$ recovery sent from the external devices.

Further, the information management method according to a certain aspect of the present disclosure is an information management method by a server configured to be able to communicate with a plurality of external devices able to send and receive information, which method receives amounts of $CO_2$ recovery recovered by vehicles provided with $CO_2$ recovery devices sent from the external devices and adds up and manages the received amounts of $CO_2$ recovery.

According to these aspects of the present disclosure, it is possible to add up amounts of $CO_2$ recovery sent from external devices at a server all together, so it is possible to accurately add up and manage the amounts of $CO_2$ recovery recovered by vehicles provided with $CO_2$ recovery devices.

DESCRIPTION OF EMBODIMENTS

Below, embodiments of the present disclosure will be explained in detail referred to the drawings. Note that, in the following explanation, similar component elements are assigned the same reference notations.

First Embodiment

Figure 1:
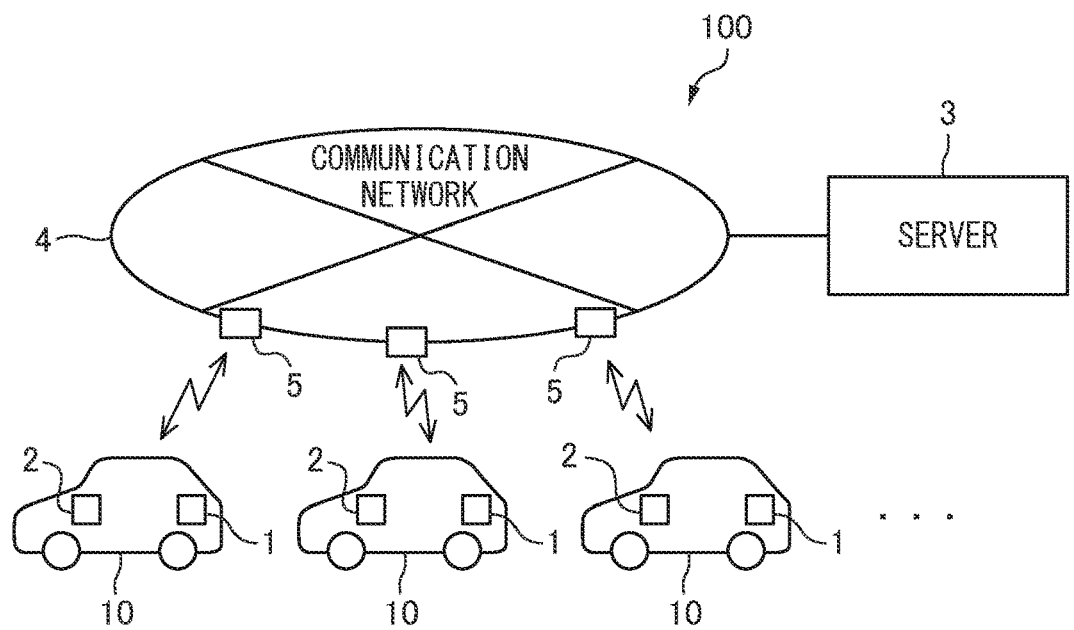
FIG. 1 is a schematic view of the configuration of an information management system according to a first embodiment of the present disclosure.

FIG. 1 is a schematic view of the configuration of an information management system 100 according to a first embodiment of the present disclosure.

As shown in FIG. 1, the information management system 100 according to the present embodiment is provided with external devices 2 mounted in each of a plurality of vehicles 10 provided with $CO_2$ recovery devices 1 and a server 3.

The external devices 2 and server 3 are connected through a communication network 4 configured by optical communication lines etc. and are designed to be able to communicate with each other. In the present embodiment, the external devices 2 access wireless base stations 5 connected through the communication network 4 and a gateway (not shown) etc. and thereby are connected with the communication network 4 through the wireless base stations 5. Further, the server 3 is connected with the communication network 4 through a gateway (not shown).

Figure 3:
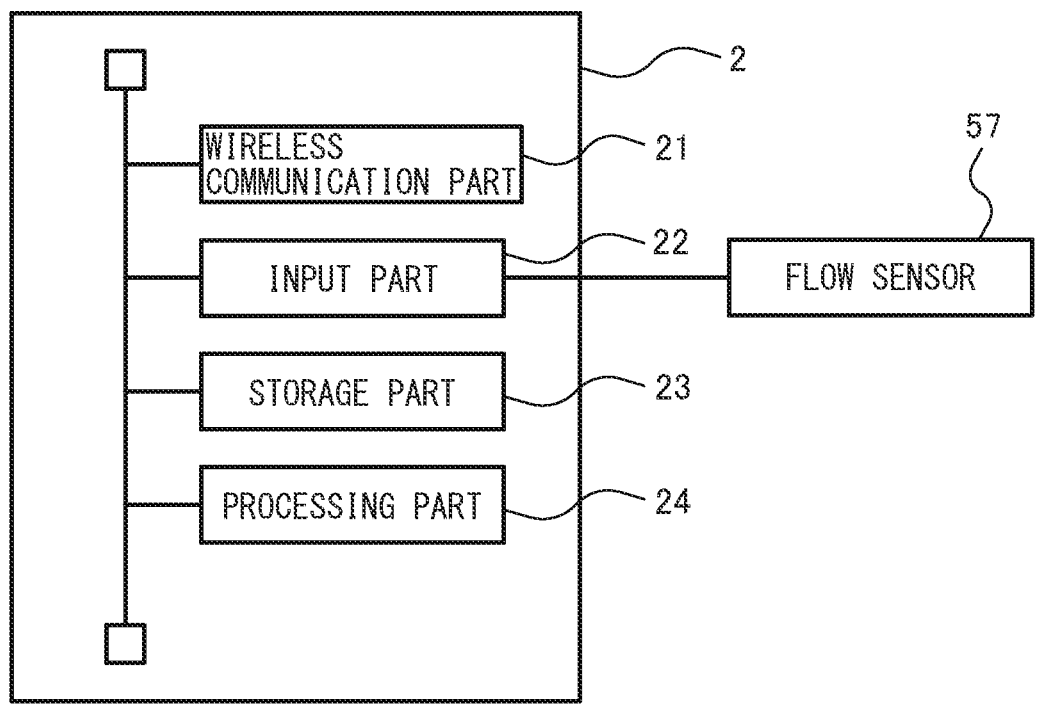
FIG. 3 is a schematic view of the configuration of an external device according to the first embodiment of the present disclosure.
Figure 4:
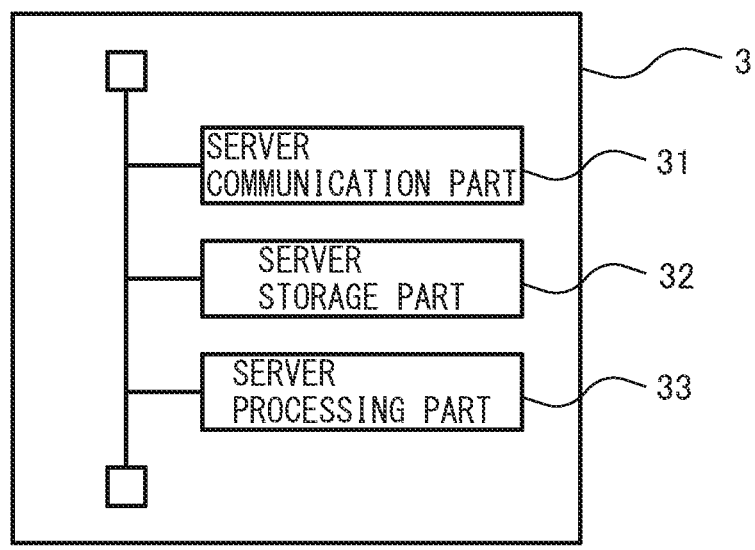
FIG. 4 is a schematic view of the configuration of a server according to the first embodiment of the present disclosure.

Below, referring to FIG. 2 to FIG. 4, details of a $CO_2$ recovery device 1, an external device 2, and the server 3 will be explained.

First, referring to FIG. 2, details of the $CO_2$ recovery device 1 will be explained. FIG. 2 is a schematic view of the configuration of the $CO_2$ recovery device 1 according to the present embodiment.

The $CO_2$ recovery device 1 is stored in for example a luggage space of a vehicle 10. In the present embodiment, the vehicle 10 is provided with an internal combustion engine (not shown). The $CO_2$ recovery device 1 is configured to be able to recover the $CO_2$ in the exhaust discharged from the internal combustion engine to the inside of an exhaust pipe 11. The method of recovery of $CO_2$ in the exhaust by the $CO_2$ recovery device 1 is not particularly limited, but for example a physical adsorption method or physical absorption method, chemical absorption method, cryogenic separation method, etc. such as explained below may be mentioned.

The physical adsorption method is the method of for example bringing activated carbon or zeolite or another solid adsorbent into contact with the exhaust to thereby make the $CO_2$ be adsorbed at the solid adsorbent and of heating this (or reducing the pressure of this) so as to make the $CO_2$ desorb from the solid adsorbent.

The physical absorption method is the method of bringing an absorption solution able to dissolve $CO_2$ (for example, methanol or ethanol) into contact with the exhaust to physically make the $CO_2$ be absorbed by the absorption solution at a high pressure and low temperature and of heating this (or reducing the pressure of this) so as to recover the $CO_2$ from the adsorption solution.

The chemical absorption method is the method of bringing an absorption solution able to selectively dissolve $CO_2$ (for example, an amine) into contact with the exhaust to make the $CO_2$ be absorbed by the absorption solution by a chemical reaction and of heating this so as to make the $CO_2$ disassociate from the solid adsorbent for recovery.

The cryogenic separation method is a method of compressing and cooling the exhaust to cause the $CO_2$ to liquefy and of selectively distilling the liquefied $CO_2$ to thereby recover the $CO_2$.

In the present embodiment, as the method for recovery of the $CO_2$ in the exhaust, the physical adsorption method is employed. The $CO_2$ recovery device 1 is configured so as to make the zeolite used as the solid adsorbent adsorb the $CO_2$ in the exhaust for recovery.

Figure 2:
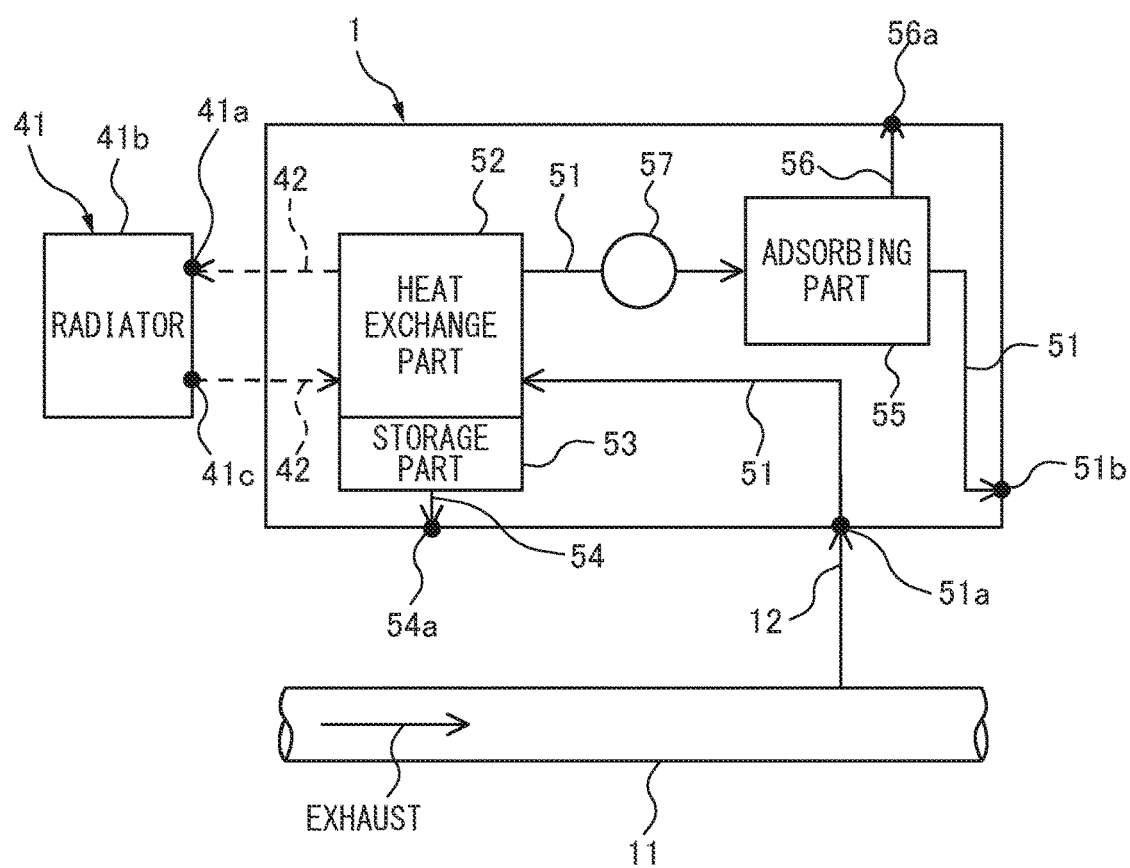
FIG. 2 is a schematic view of the configuration of a $CO_2$ recovery device according to the first embodiment of the present disclosure.

Specifically, as shown in FIG. 2, the $CO_2$ recovery device 1 according to the present embodiment is provided with a gas introduction port 51*a*, gas discharge port 51*b*, gas flow passage 51 connecting the gas introduction port 51*a* and gas discharge port 51*b*, radiator 41, cooling water circulation passage 42, heat exchange part 52 and adsorbing part 55 arranged above the gas flow passage 51, storage part 53, liquid discharge port 54*a*, liquid flow path 54 connecting the storage part 53 and liquid discharge port 54*a*, $CO_2$ collection port 56*a*, recovery passage 56 connecting the adsorbing part 55 and $CO_2$ collection port 56*a*, and flow sensor 57.

The gas introduction port 51*a* is an inlet for introducing gas containing $CO_2$ into the gas flow passage 51 inside the $CO_2$ recovery device 1. In the present embodiment, the gas introduction port 51*a* is connected through the connecting pipe 12 to the exhaust pipe 11 so as to enable gas flowing through the exhaust pipe 11 to be introduced from the gas introduction port 51*a* to the gas flow passage 51. The exhaust introduced from the gas introduction port 51*a* to the gas flow passage 51 flows through the gas flow passage 51 and is finally discharged from the gas discharge port 51*b*.

The radiator 41 is provided with a cooling water inlet part 41*a*, core part 41*b*, and cooling water outlet part 41*c*. The high temperature cooling water introduced from the cooling water inlet part 41*a* is cooled at the core part 41*b* by for example heat exchange with the air or other low temperature gas then is discharged from the cooling water outlet part 41*c*.

The cooling water circulation passage 42 is a passage for supplying cooling water discharged from the radiator 41 to the heat exchange part 52 for cooling the exhaust introduced to the $CO_2$ recovery device 1, then returning it to the radiator 41 for circulation. The cooling water circulation passage 42 is connected at one end to the cooling water inlet part 41*a* of the radiator 41 and is connected at the other end to the cooling water outlet part 41*c* of the radiator 41.

The heat exchange part 52 is connected to the gas flow passage 51 and cooling water circulation passage 42. It is configured to exchange heat between the exhaust flowing through the gas flow passage 51 and the cooling water flowing through the cooling water circulation passage 42 and enable the exhaust flowing through the gas flow passage 51, that is, the exhaust introduced inside of the $CO_2$ recovery device 1, to be cooled.

The storage part 53 stores the condensed water formed by cooling the exhaust at the heat exchange part 52. The condensed water inside the storage part 53 is discharged through the liquid flow path 54 from the liquid discharge port 54*a* to outside the $CO_2$ recovery device 1.

The adsorbing part 55 is connected to the gas flow passage 51 at the downstream side from the heat exchange part 52 so as to be able to introduce the exhaust cooled by the heat exchange part 52 to inside it. The adsorbing part 55 has zeolite as a solid adsorbent inside it and adsorbs the $CO_2$ in the exhaust introduced through the gas flow passage 51 to the inside of the adsorbing part 55. The exhaust from which $CO_2$ has been adsorbed by the adsorbing part 55 and thereby reduced in $CO_2$ concentration flows through the gas flow passage 51 at the downstream side from the adsorbing part 55 and is discharged from the gas discharge port 51*b* into the outside air.

The recovery passage 56 is a passage for recovering the $CO_2$ adsorbed at the solid adsorbent of the adsorbing part 55 from the $CO_2$ collection port 56*a*. In the present embodiment, the adsorbing part 55 is heated through the recovery passage 56 while depressurizing the adsorbing part 55 to thereby make the $CO_2$ adsorbed at the solid adsorbent desorb from the solid adsorbent and the desorbed $CO_2$ is sucked out through the recovery passage 56 from the adsorbing part 55 and recovered from the $CO_2$ collection port 56*a*. Note that, if necessary, it is also possible to provide a shutoff valve in the recovery passage 56 and open the shutoff valve only at the time of recovery of carbon dioxide.

The flow sensor 57 is provided at the gas flow passage 51 between the heat exchange part 52 and the adsorbing part 55 and detects the amount of flow of the exhaust introduced to the adsorbing part 55. In the present embodiment, the amount of the $CO_2$ adsorbed at the adsorbing part 55, that is, the amount of $CO_2$ recovered by the vehicle 10 (below, referred to as the "amount of $CO_2$ recovery"), is calculated based on the amount of flow of exhaust detected by this flow sensor 57.

Next, referring to FIG. 3, details of the external device 2 will be explained. FIG. 3 is a schematic view of the configuration of the external device 2 according to the present embodiment.

The external device 2 is provided with a wireless communicating part 21, input part 22, storage part 23, and processing part 24.

The wireless communicating part 21 is provided with an antenna and a signal processing circuit performing various types of processing relating to wireless communication such as modulation and demodulation of the wireless signal. When the wireless communicating part 21 receives a downlink wireless signal from a wireless base station 5 connected through the communication network 4 and gateway etc., it transfers that wireless signal to the processing part 24. Further, when a signal sent from the processing part 24 to the server 3 (for example, a later explained information communicating signal etc.) is transferred to it, the wireless communicating part 21 generates an uplink wireless signal containing that signal and sends it to the wireless base station 5.

The input part 22 is provided with a terminal for inputting to the external device 2 the output signals from the various types of sensors mounted in the vehicle 10. In the present embodiment, the input part 22 receives as input the output signal of the flow sensor 57.

The storage part 23 has a HDD (hard disk drive), optical storage medium, semiconductor memory, or other storage medium and stores various types of computer programs run at the processing part 24 and various types of data used at the processing part 24. Further, the storage part 23 stores the data generated at the processing part 24 and the data received by the processing part 24 through the communication network 4 from the server 3.

The processing part 24 has one or more processors and their peripheral circuits. The processing part 24 performs various types of processing based on a computer program stored in the storage part 23. The processing part 24 can run a plurality of computer programs in parallel. Details of the processing run at the processing part 24 will be explained later with reference to the flow chart of FIG. 5.

Next, referring to FIG. 4, details of the server 3 will be explained. FIG. 4 is a schematic view of the configuration of the server 3.

The server 3 is provided with a server communicating part 31, server storage part 32, and server processing part 33.

The server communicating part 31 has an interface circuit for connecting the server 3, for example, through a gateway etc. to the communication network 4. The server communicating part 31 transfers a wireless signal received through the communication network 4 from the external device 2 to the server processing part 33. Further, the server communicating part 31 generates a wireless signal containing a signal for transmission from the server processing part 33 to an external device 2 (for example, the later explained update completion signal etc.) if that signal is transferred and sends it through the communication network 4 to the external device 2.

The server storage part 32 has an HDD (hard disk drive), optical recording medium, or semiconductor memory or other storage medium and stores computer programs to be run in the server processing part 33 and various types of data used in the server processing part 33 (for example, vehicle identification data etc. for identifying the vehicles 10). Further, the server storage part 32 stores data generated by the server processing part 33 and data received by the server processing part 33 through the communication network 4 from the external device 2.

The server processing part 33 has one or more processors and their peripheral circuits. The server processing part 33 runs various types of processing based on computer programs stored in the server storage part 32. The server processing part 33 can run several computer programs in parallel. The details of the processing run at the server processing part 33 will be explained later referring to the flow chart of FIG. 5.

Figure 5:
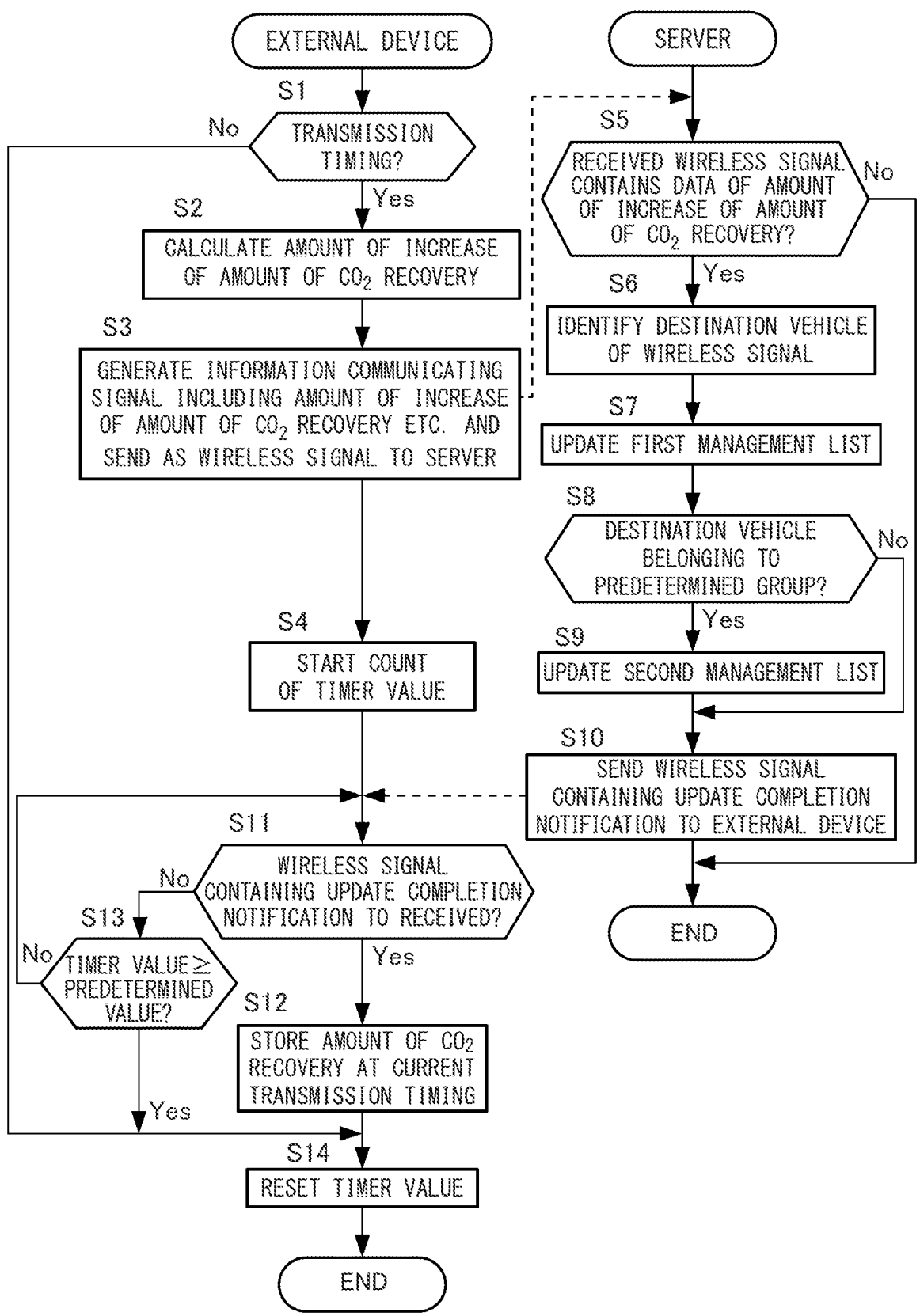
FIG. 5 is a flow chart explaining details of processing according to the first embodiment of the present disclosure performed in an external device and a server.

FIG. 5 is a flow chart explaining details of the processing part 24 of the external device 2 and server processing part 33. In the flow chart shown in FIG. 5, the external device 2 and the server 3 communicate through the communication network 4.

At step S1, the processing part 24 of the external device 2 judges if the timing is the transmission timing for sending the amount of $CO_2$ recovery of a vehicle 10 at which an external device 2 is mounted. In the present embodiment, the transmission timing is made every predetermined period during the time in which the vehicle 10 is being driven and the timing for collecting the $CO_2$ at a location at which a device able to collect $CO_2$ adsorbed at the adsorbing part 55 ($CO_2$ collection device) is installed, that is, a location at which $CO_2$ can be collected from a $CO_2$ recovery device 1 (below, referred to as a "$CO_2$ collection location"). As an example of the $CO_2$ collection location, for example, an existing gasoline station etc. may be mentioned. The processing part 24 of the external device 2 proceeds to the processing of step S2 if the timing is the transmission timing and ends the present processing if not the transmission timing.

At step S2, the processing part 24 of the external device 2 reads in the amount of $CO_2$ recovery at the previous transmission timing stored in the storage part 23 and reads in the current amount of $CO_2$ recovery processed at the processing part 24 of the external device 2 at nonspecific times and stored in the storage part 23 as the amount of $CO_2$ recovery at the current transmission timing and calculates the amount of increase of the amount of $CO_2$ recovery from the previous transmission timing to the current transmission timing (below, referred to as the "amount of $CO_2$ increase").

At step S3, the processing part 24 of the external device 2 generates an information communicating signal containing data of the amount of $CO_2$ increase calculated at step S2 and vehicle identification data (for example, vehicle number) of the vehicle 10 in which the external device 2 is mounted. Further, the processing part 24 of the external device 2 transfers the generated information communicating signal to the wireless communicating part 21, and the wireless communicating part 21 sends the information communicating signal as a wireless signal from the wireless communicating part 21 to the server 3.

At step S4, the processing part 24 of the external device 2 starts the count of the time value for obtaining a grasp of the time elapsed from when sending the information communicating signal as a wireless signal from the wireless communicating part 21 to the server 3.

At step S5, the server processing part 33 judges if the received wireless signal (information communicating signal) contains data of the amount of $CO_2$ increase. The server processing part 33 proceeds to the processing of step S6 if the wireless signal contain data on the amount of $CO_2$ increase. On the other hand, the server processing part 33 ends the present processing if the wireless signal does not contain data on the amount of $CO_2$ increase.

At step S6, the server processing part 33 identifies the vehicle 10 which had sent the wireless signal as an originating vehicle based on the data on the amount of $CO_2$ increase and the vehicle identification data contained in the wireless signal (information communicating signal).

At step S7, the server processing part 33 reads in a first management list stored in the server storage part 32. The first management list is a list which describes added up the amounts of $CO_2$ recovery up to now of each vehicle 10 (below, referred to as the "total amount of $CO_2$ recovery"). Further, the server processing part 33 adds the amount of $CO_2$ increase which had been contained in the received wireless signal (information communicating signal) to the total amount of $CO_2$ recovery of the originating vehicle described in the first management list so as to update the first management list and stores the updated first management list in the server storage part 32.

At step S8, the server processing part 33 judges if the originating vehicle belongs to a predetermined group (for example, a taxi company or another predetermined business)

based on the vehicle identification data. The server processing part 33 proceeds to the processing of step S9 if the originating vehicle belongs to a predetermined group. On the other hand, the server processing part 33 proceeds to the processing of step S10 if the originating vehicle does not belong to any group.

At step S9, the server processing part 33 reads in a second management list stored at the server storage part 32. The second management list is a list which describes added up the amounts of $CO_2$ recovery up to now of each group to which each vehicle 10 belongs (below, referred to as the "total group amount of $CO_2$ recovery"). Further, the server processing part 33 adds the amount of $CO_2$ increase which had been included in the received wireless signal (information communicating signal) to the total group amount of $CO_2$ recovery of the group to which the originating vehicle described in the second management list belongs so as to update the second management list and stores the updated second management list in the server storage part 32.

At step S10, the server processing part 33 generates an update completion notification of the management lists and transfers it to the server communicating part 31. It sends a wireless signal containing the update completion notification from the server communicating part 31 to the external device 2.

At step S11, the processing part 24 of the external device 2 identifies if a wireless signal containing an update completion notification has been received from the server 3. Specifically, the processing part 24 of the external device 2 judges if the wireless signal transferred from the wireless communicating part 21 had contained an update completion notification. The processing part 24 of the external device 2 proceeds to the processing of step S12 when receiving a wireless signal containing an update completion notification from the server 3. On the other hand, the processing part 24 of the external device 2 proceeds to the processing of step S13 if a wireless signal containing an update completion notification is not received from the server 3.

At step S12, the processing part 24 of the external device 2 stores the amount of carbon dioxide recovery at the current transmission timing in the storage part 23.

At step S13, the processing part 24 of the external device 2 identifies whether the timer value is a preset predetermined value or more. The processing part 24 of the external device 2 proceeds to the processing of step S14 if the timer value is the predetermined value or more. On the other hand, the processing part 24 of the external device 2 proceeds to the processing of step S11 again after a predetermined interval if the timer value is less than the predetermined value.

At step S14, the processing part 24 of the external device 2 resets the timer value and returns it to zero.

The information management system 100 according to the present embodiment explained above is provided with a plurality of external devices 2 able to send and receive information and a server 3 configured to be able to communicate with the external devices 2. The external devices 2 are configured so as to send to the server 3 the amounts of $CO_2$ recovery recovered by vehicles 10 provided with $CO_2$ recovery devices 1. The server 3 is configured so as to add up and manage the amounts of $CO_2$ recovery sent from the external devices 2.

Due to this, the amounts of $CO_2$ recovery sent from the external devices 2 can be added up and managed by the server 3 all together, so the amounts of $CO_2$ recovery recovered by vehicles 10 provided with the $CO_2$ recovery devices 1 can be accurately added up and managed.

Further, in the present embodiment, an external device 2 is mounted at each vehicle 10 and is configured to send to the server 3 the amount of $CO_2$ recovery of its vehicle recovered by the $CO_2$ recovery device 1. Further, the server 3 is configured to add up and manage the amounts of $CO_2$ recovery sent from the external devices 2 mounted in the vehicles 10 individually for each vehicle 10 or for each group to which vehicles 10 belong.

Due to this, it is possible to accurately add up and manage the amounts of $CO_2$ recovery of each vehicle 10. For this reason, it is possible to easily obtain a grasp of the amount of carbon dioxide recovery for each vehicle 10. Therefore, for example, it becomes possible for a business operating a large number of vehicles 10 to compare the amounts of $CO_2$ recovery of the individual vehicles 10, so use for operations becomes easy.

Further, it is possible to accurately add up and manage the amounts of $CO_2$ recovery of a group to which vehicles 10 belong as a whole. For this reason, for example, a business operating a large number of vehicles 10 could easily use the information in its operations such as publicizing the amount of $CO_2$ recovery of its own business as a whole.

Note that, in the present embodiment, as explained above, in the first management list, the total amount of the amounts of $CO_2$ recovery which each vehicle 10 had recovered up to then was managed, but instead or this or separate from this, it is also possible to manage the total amount of the amounts of $CO_2$ recovery recovered in a certain fixed time period. Due to this, it is possible to obtain a grasp of the amount of $CO_2$ recovery recovered in a certain fixed time period, so for example it is possible to compare the amounts of $CO_2$ recovery for individual time periods. Further, if possible to identify the drivers of the vehicles 10, it is also possible to manage the total amount of the amounts of $CO_2$ recovery recovered up to now or in a certain time period by each driver. Due to this, if having a single vehicle 10 used by a number of persons, it is possible to obtain a grasp of and compare the amount of $CO_2$ recovery of each user.

Second Embodiment

Next, a second embodiment of the present disclosure will be explained. The present embodiment differs from the first embodiment on the point of displaying the total amount of $CO_2$ recovery of each vehicle 10 or the total group amount of $CO_2$ recovery of the group to which each vehicle 10 belongs to the inside or the outside of the vehicle. Below, this point of difference will be focused on in the explanation.

Figure 6:
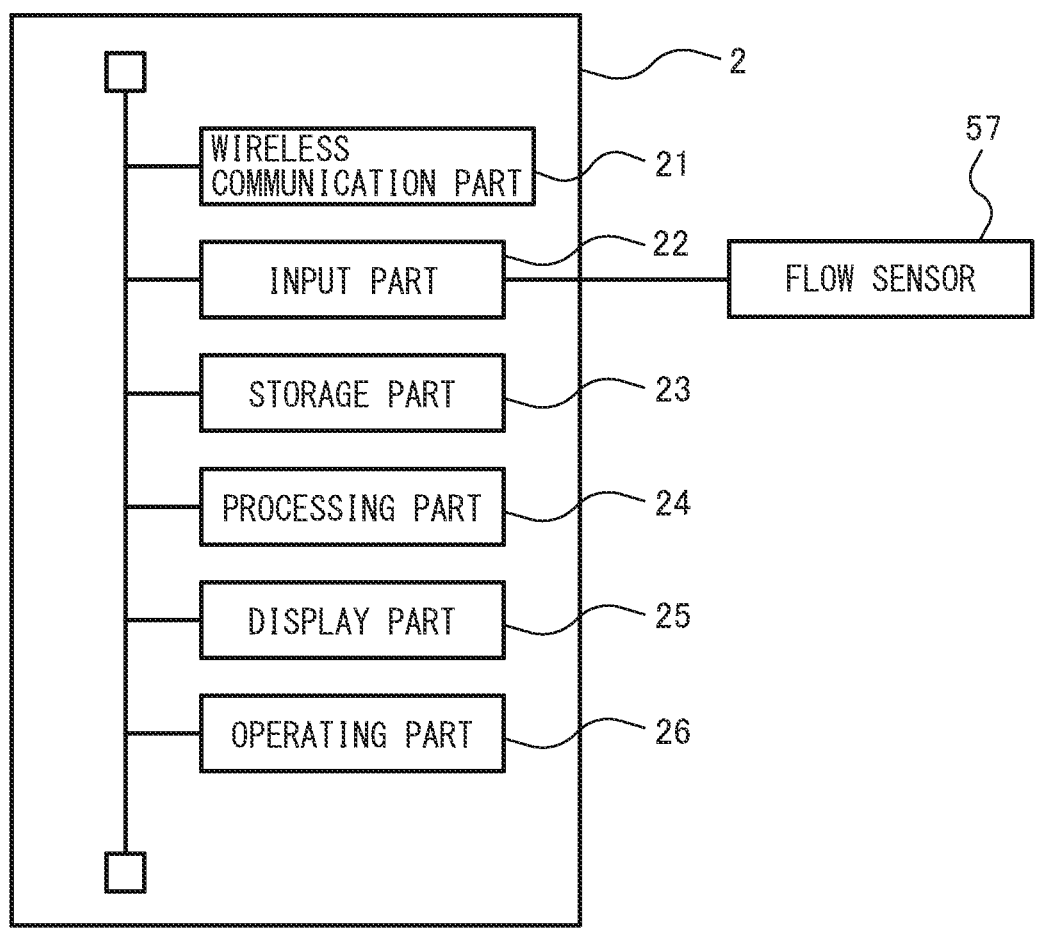
FIG. 6 is a schematic view of the configuration of an external device according to the first embodiment of the present disclosure.

FIG. 6 is a schematic view of the configuration of an external device 2 of the present embodiment.

The external device 2 is provided with the above-mentioned wireless communicating part 21, input part 22, storage part 23, and processing part 24 plus a display part 25 and operating part 26.

The display part 25 is provided with an information display screen placed at a position able to be viewed by an occupant of the vehicle 10 or a position able to be viewed by an unspecified large number of people outside of the vehicle 10. The information display screen is, for example, a liquid crystal display or organic EL display, transmissive display, or other various types of displays. The display part 25 displays information corresponding to an information display signal output from the processing part 24 (for example, text information or image information) on the information display screen.

The operating part 26 is provided with an entry part for an occupant inside of the vehicle 10 to perform entry operations. The entry part is, for example, a touch panel or various types of physical entry buttons etc. arranged at a position able to be viewed by an occupant of the vehicle 10. The operating part 26 generates and outputs an operating signal in accordance with the entry operations of the vehicle.

Figure 7:
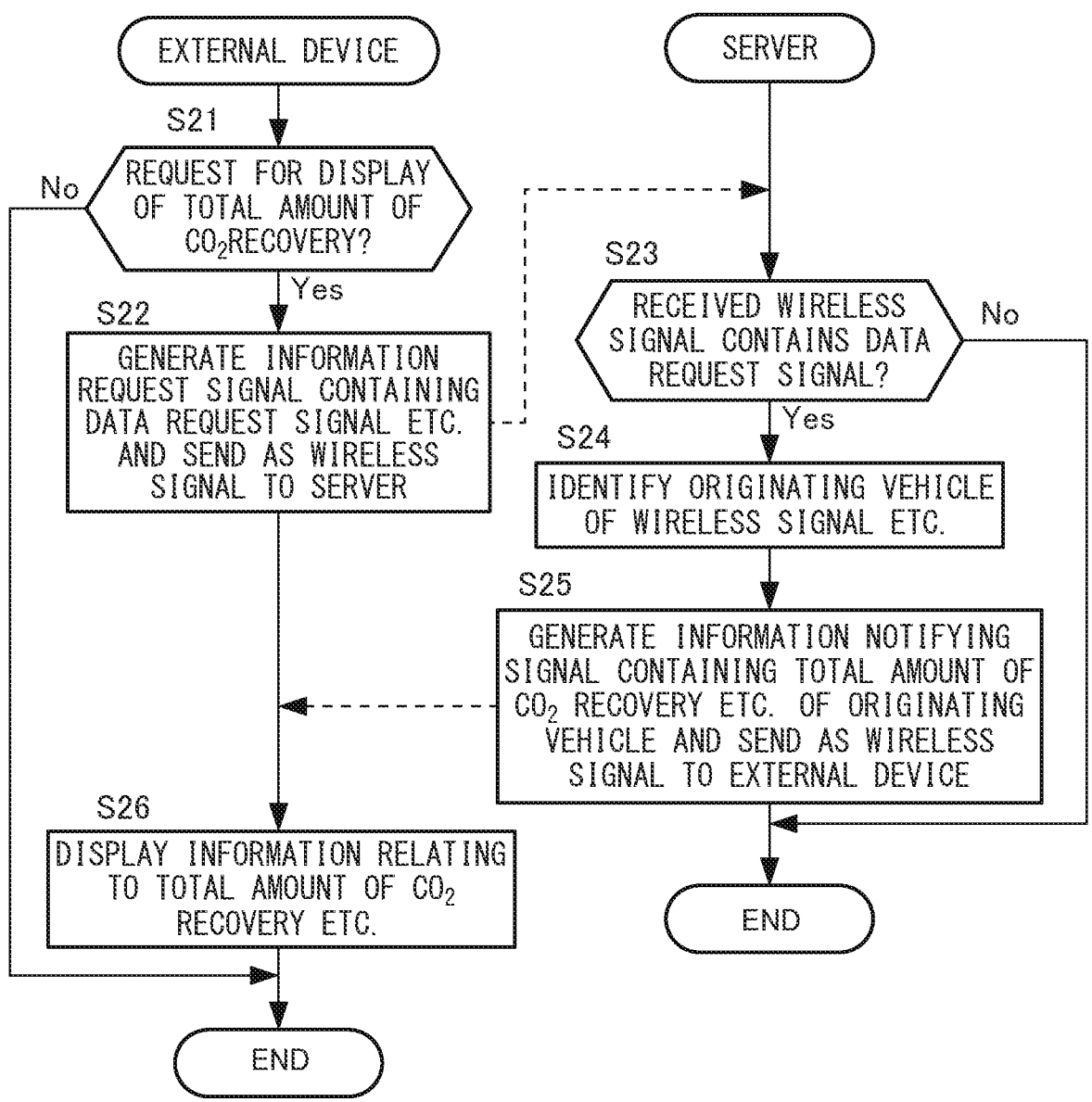
FIG. 7 is a flow chart explaining details of processing according to the first embodiment of the present disclosure performed in an external device and a server.

FIG. 7 is a flow chart explaining details of processing according to the present embodiment performed at the processing part 24 of the external device 2 and server processing part 33. In the flow chart shown in FIG. 7, the external device 2 and server 3 communicate through the communication network 4.

At step S21, the processing part 24 of the external device 2 judges if there has been a request for display of the total amount of $CO_2$ recovery or the total group amount of $CO_2$ recovery. Specifically, the processing part 24 of the external device 2 judges if an entry operation has been performed through the operating part 26 by an occupant of the vehicle 10 requesting the total amount of $CO_2$ recovery or total group amount of $CO_2$ recovery and if an operation signal corresponding to the entry operation from the operating part 26 has been transferred. The processing part 24 of the external device 2 proceeds to the processing of step S22 if it is judged that there has been a request for display of the total amount of $CO_2$ recovery or the total group amount of $CO_2$ recovery. On the other hand, the processing part 24 of the external device 2 ends the present processing if it is judged there has been no request for display of the total amount of $CO_2$ recovery or the total group amount of $CO_2$ recovery.

At step S22, the processing part 24 of the external device 2 generates an information request signal containing a data request signal requesting transmission of data of the total amount of $CO_2$ recovery or the total group amount of $CO_2$ recovery from the server 3 and vehicle identification data of the vehicle 10 in which the external device 2 is mounted. Further, the processing part 24 of the external device 2 transfers the generated information request signal to the wireless communicating part 21 and the wireless communicating part 21 sends the information request signal as a wireless signal from the wireless communicating part 21 to the server 3.

At step S23, the server processing part 33 judges if the wireless signal received (information request signal) contains a data request signal. The server processing part 33 proceeds to the processing of step S24 if the wireless signal contains a data request signal. On the other hand, the server processing part 33 ends the present processing if the wireless signal does not contain a data request signal.

At step S24, the server processing part 33 identifies the vehicle 10 sending the wireless signal as an originating vehicle based on the data request signal and the vehicle identification data which had been contained in the wireless signal. Further, the server processing part 33 judges if the originating vehicle belongs to a predetermined group based on the vehicle identification data and, if it belongs to a predetermined group, identifies that as the group to which the originating vehicle belongs.

At step S25, the server processing part 33 refers to the first management list and reads in the total amount of $CO_2$ recovery of the originating vehicle. Further, the server processing part 33 refers to the second management list and reads in the total group amount of $CO_2$ recovery of the group to which the originating vehicle belongs if the originating vehicle belongs to a predetermined group. Further, the server processing part 33 generates an information notifying signal containing the total amount of $CO_2$ recovery of the originating vehicle and the total group amount of $CO_2$ recovery of the group to which the originating vehicle belongs if the originating vehicle belongs to a predetermined group, transfers it to the server communicating part 31, and sends the wireless signal containing the information notifying signal from the server communicating part 31 to the external device 2.

Figure 8:
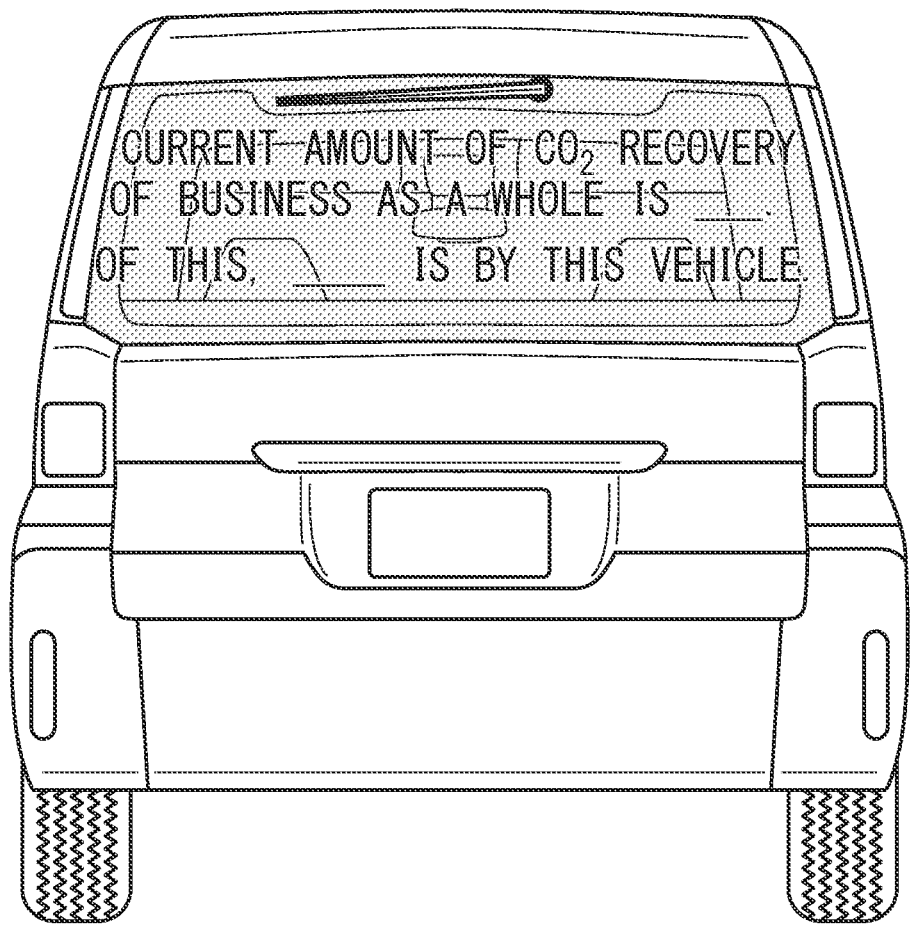
FIG. 8 is a view showing an example of displaying a total amount of $CO_2$ recovery of one's own vehicle in a rear window of the vehicle.

At step S26, the processing part 24 of the external device 2 takes out the data of the total amount of $CO_2$ recovery and the data of the total group amount of $CO_2$ recovery of the group to which the vehicle belongs from the received wireless signal (information notifying signal). Further, the processing part 24 of the external device 2 generates an information display signal containing these data and outputs it to the display part 25 where, for example as shown in FIG. 8, it displays information relating to the total amount of $CO_2$ recovery of its vehicle and the total group amount of $CO_2$ recovery of the group to which the vehicle belongs on the information display screen. Note that, FIG. 8 is a view showing an example of displaying the total amount of $CO_2$ recovery of a vehicle 10 in a rear window of its vehicle using the rear window as a transmissive display (information display screen).

According to the present embodiment explained above, the server 3 is configured to send to the external device 2 of the vehicle 10 the added up amount of $CO_2$ recovery added up individually for each vehicle 10 or for each group to which the vehicle 10 belongs (that is, the total amount of $CO_2$ recovery or total group amount of $CO_2$ recovery). Further, the external device 2 is provided with a display part 25 displaying information to the inside or outside of the vehicle and is configured to display on the display part 25 information relating to the added up amount of $CO_2$ recovery of its vehicle sent from the server 3 (that is, the total amount of $CO_2$ recovery) or the added up amount of $CO_2$ recovery of the group to which its vehicle belongs (that is, the total group amount of $CO_2$ recovery).

Due to this, it is possible to inform the total amount of $CO_2$ recovery of the vehicle 10 or the total group amount of $CO_2$ recovery of the group to which the vehicle 10 belongs to a large number of people inside and outside of the vehicle 10. For this reason, for example, it is possible to proactively promote the effort of the business operating the vehicle 10 to improve the environment among a large number of people.

Note that, if looking at the present embodiment from another viewpoint, the vehicle 10 according to the present embodiment may be said to be provided with a display part 25 displaying information at the inside or outside of the vehicle and a processing part 24 configured so as to display at the display part 25 information relating to the total amount of $CO_2$ recovery of its vehicle or the total group amount of $CO_2$ recovery of the group to which its vehicle belongs.

Third Embodiment

Next, a third embodiment of the present disclosure will be explained. The present embodiment differs from the first embodiment on the point that an external device 2 is installed at each $CO_2$ collection location 6. Below, this point of difference will be focused on in the explanation.

Figure 9:
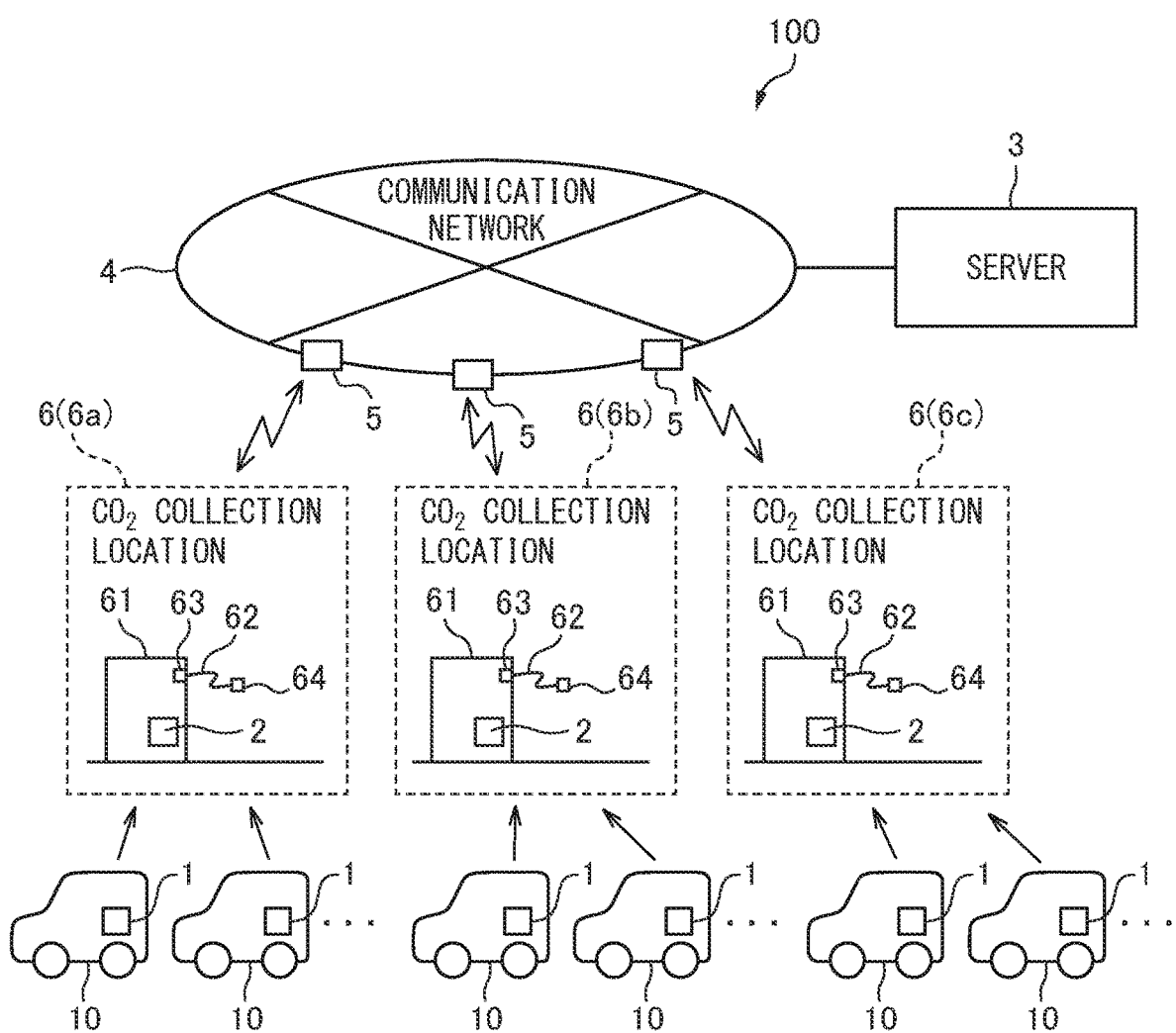
FIG. 9 is a schematic view of the configuration of an information management system according to a third embodiment of the present disclosure.

FIG. 9 is a schematic view of the configuration of an information management system 100 according to the third embodiment of the present disclosure.

As shown in FIG. 9, the information management system 100 according to the present embodiment is provided with an external device 2 installed at each $CO_2$ collection location 6 and a server 3.

In the example shown in FIG. 9, among the $CO_2$ collection locations 6, the $CO_2$ collection locations 6a, 6b are, for example, exclusive use $CO_2$ collection locations provided at the different branches of a business or other group (for example, a Tokyo branch or Osaka branch etc.) Further, the $CO_2$ collection location 6c is an exclusive use $CO_2$ collection location of a separate group. That is, the group operating the $CO_2$ collection locations 6a, 6b and the group operating the $CO_2$ collection location 6c are different.

At each $CO_2$ collection location 6, a $CO_2$ collection device 61 is installed for collecting the $CO_2$ of the $CO_2$ recovery devices 1 of the vehicles 10.

The $CO_2$ collection device 61 is provided with a hose 62 connected with a $CO_2$ collection port 56a of the $CO_2$ recovery device 1 mounted in the vehicle 10 (see FIG. 2) and collecting $CO_2$ from the $CO_2$ recovery device 1. Further, the $CO_2$ collection device 61 is, for example, provided with a flow sensor 63 provided at the inside of the $CO_2$ collection device 61 and detecting the amount of flow of the $CO_2$ flowing in through the hose 62 to the $CO_2$ collection device 61. In the present embodiment, the amount of $CO_2$ collected from the $CO_2$ recovery device 1 (below, referred to as the "amount of $CO_2$ collection") is calculated based in the amount of flow detected by this flow sensor 63. Further, the $CO_2$ collection device 61 is, for example, provided with a connection sensor 64 provided at the front end of the hose 62 and detecting that the hose 62 and $CO_2$ collection port 56a of the $CO_2$ recovery device 1 have been connected.

Further, a large number of vehicles 10 provided with $CO_2$ recovery devices 1 are associated with each $CO_2$ collection location 6. Each vehicle 10 basically has the $CO_2$ collected at the $CO_2$ collection location 6 associated with its vehicle among the $CO_2$ collection locations 6. For example, if the $CO_2$ collection location 6a is an exclusive use $CO_2$ collection location of the Tokyo branch of a certain group, the vehicles 10 operated by the Tokyo branch of the group basically have the $CO_2$ collected at the $CO_2$ collection location 6a.

In this case, if possible for a business or other certain group to add up and manage the amounts of $CO_2$ collection collected from the vehicles 10 at the $CO_2$ collection locations 6a, 6b which it operates all together, it would become easy to obtain a grasp of the amounts of $CO_2$ recovery recovered by all of the vehicles 10 which it operates. Further, if possible to individually add up and manage the amounts of the $CO_2$ collection collected from the vehicles 10 at the $CO_2$ collection locations 6a, 6b individually for the $CO_2$ collection locations 6a, 6b, it would become easy to compare the amounts of $CO_2$ collection of the $CO_2$ collection locations 6a, 6b.

Therefore, in the present embodiment, the amounts of $CO_2$ collection collected at the $CO_2$ collection locations 6 (that is, the amounts of $CO_2$ recovery recovered by the vehicles 10 associated with the $CO_2$ collection locations 6) are made able to be added up and managed for every group operating a $CO_2$ collection location 6 and are made able to be added up and managed for each $CO_2$ collection location 6. Below, in the present embodiment, the processing performed at the processing part 24 of an external device 2 and server processing part 33 will be explained. Note that, before that, in the present embodiment, the configurations of the $CO_2$ recovery device 1 and server 3 are basically the same, but the configuration of the external device 2 partially differs, so first the points of difference in the configuration of the external device 2 will be explained.

Figure 10:
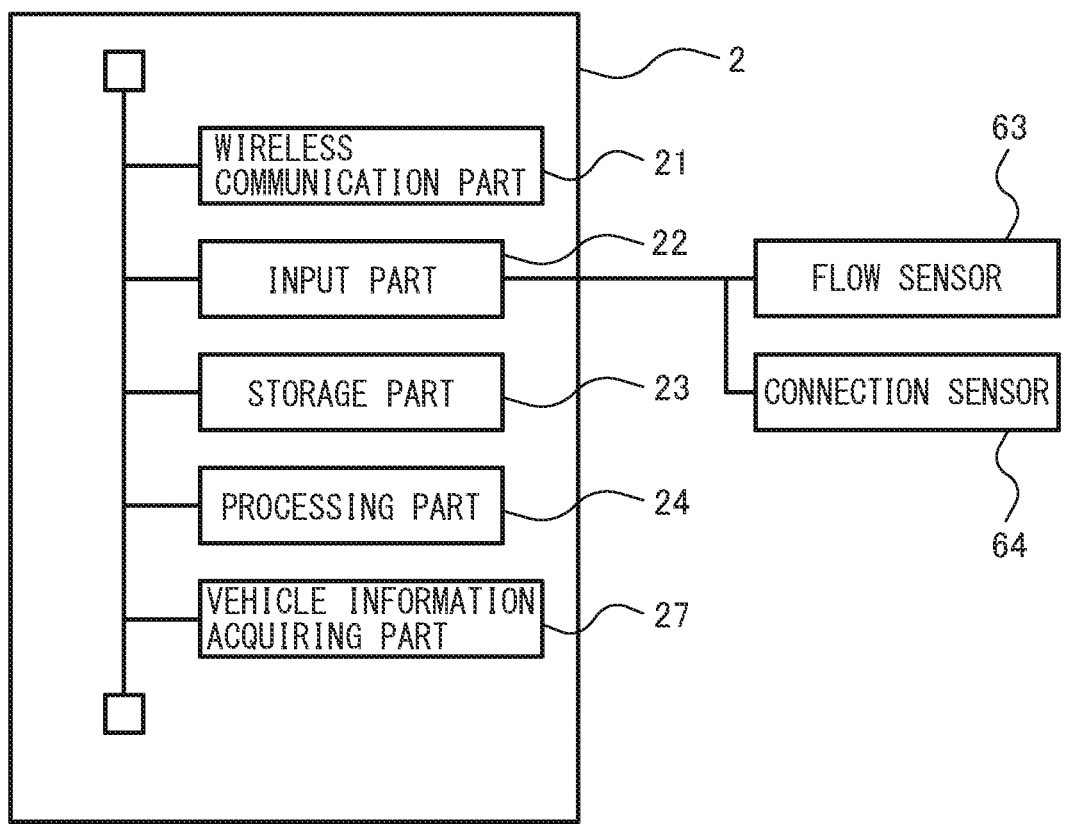
FIG. 10 is a schematic view of the configuration of an external device according to the third embodiment of the present disclosure.

FIG. 10 of a schematic view of the configuration of the external device 2 according to the present embodiment.

The external device 2 is provided with the above-mentioned wireless communicating part 21, input part 22, storage part 23, and processing part 24 plus a vehicle information acquiring part 27.

The vehicle information acquiring part 27 is, for example, provided with a near distance wireless device for communicating with a communication device (not shown) mounted in a vehicle 10. The vehicle information acquiring part 27 communicates for example with the communication device of the vehicle 10 and acquires vehicle information such as vehicle identification data of the vehicle 10 when the $CO_2$ collection device 61 installed in the $CO_2$ collection location 6 collects $CO_2$ from the $CO_2$ recovery device 1 of the vehicle 10.

Note that, in the present embodiment, the input part 22 receives as input the output signals of the above-mentioned flow sensor 63 and connection sensor 64.

Figure 11:
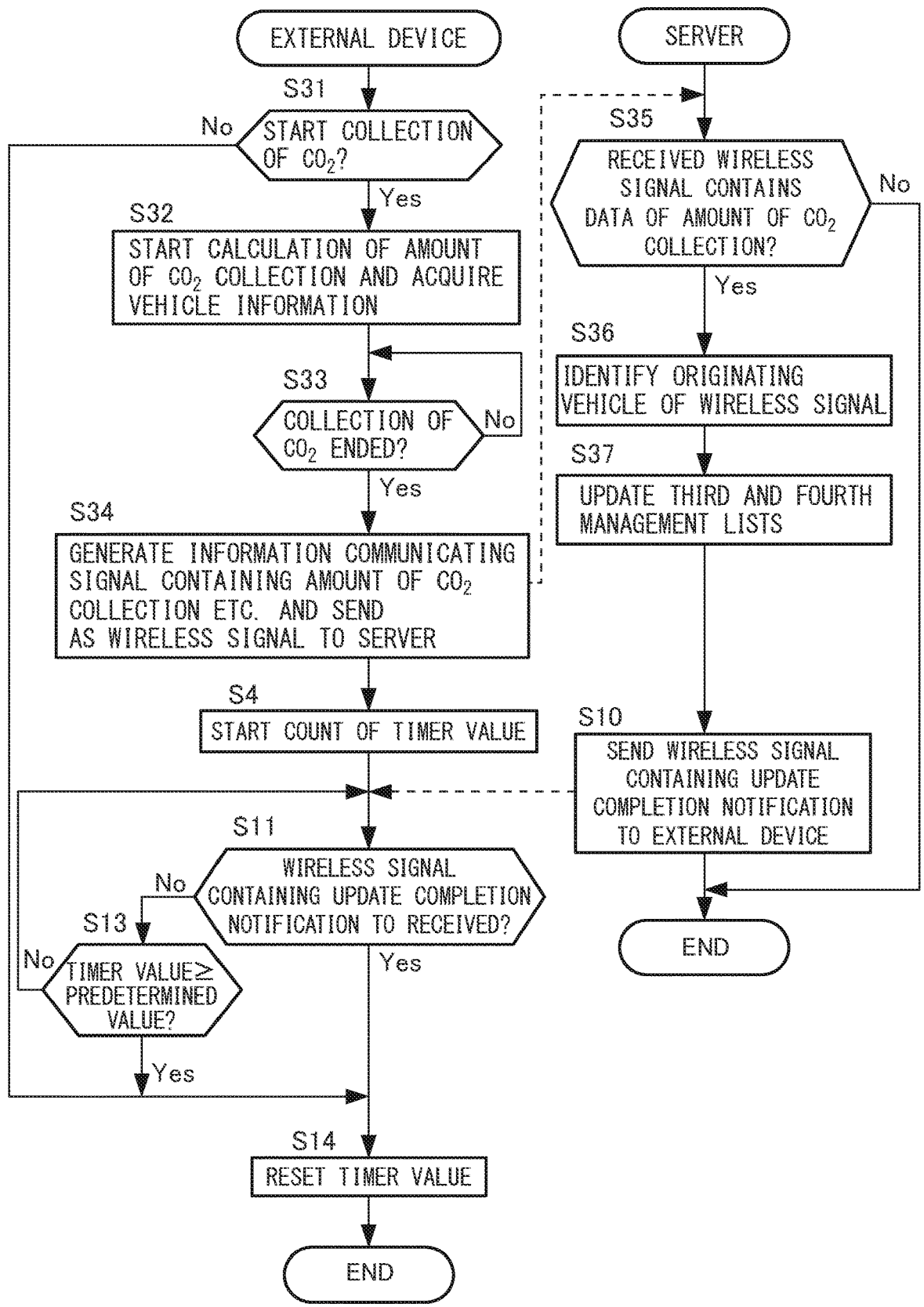
FIG. 11 is a flow chart explaining details of processing according to the third embodiment of the present disclosure performed in an external device and a server.

FIG. 11 is a flow chart explaining details of processing according to the present embodiment performed at the processing part 24 of the external device 2 and server processing part 33. In the flow chart shown in FIG. 7, communication between the external device 2 and server 3 is performed through the communication network 4. Note that, in the flow chart of FIG. 11, the contents of the processing of steps S4, S10, S11, S13, and S14 are similar to the first embodiment, so here the explanations will be omitted.

At step S31, the processing part 24 of the external device 2 judge the $CO_2$ collection device 61 has started collecting $CO_2$. In the present embodiment, the processing part 24 of the external device 2 judges that the $CO_2$ collection device 61 has started collecting $CO_2$ by when detecting that the hose 62 and $CO_2$ collection port 56a of the $CO_2$ recovery device 1 have been connected based on the output signal of the connection sensor 64. The processing part 24 of the external device 2 proceeds to the processing of step S32 if the $CO_2$ collection device 61 has started collecting $CO_2$. On the other hand, the processing part 24 of the external device 2 ends the present processing if the $CO_2$ collection device 61 is not collecting $CO_2$.

At step S32, the processing part 24 of the external device 2 starts to calculate the amount of $CO_2$ collection based on the output signal of the flow sensor 63. Further, the processing part 24 of the external device 2 acquires vehicle information containing vehicle identification data of the vehicle 10 from which the $CO_2$ is being collected through the vehicle information acquiring part 27.

At step S33, the processing part 24 of the external device 2 judges if the $CO_2$ collection device 61 has finished collecting $CO_2$. In the present embodiment, the processing part 24 of the external device 2 judges that the $CO_2$ collection device 61 has finished collecting $CO_2$ when detecting that the hose 62 and the $CO_2$ collection port 56a of the $CO_2$ recovery device 1 have been disconnected based on the output signal of the connection sensor 64. The processing part 24 of the external device 2 proceeds to the processing of step S34 if the $CO_2$ collection device 61 has finished collecting $CO_2$. On the other hand, the processing part 24 of the external device 2 performs the processing of step S33 again after a predetermined interval if the $CO_2$ collection device 61 has not finished collecting $CO_2$.

At step S34, the processing part 24 of the external device 2 generates an information communicating signal containing the amount of $CO_2$ collection when the $CO_2$ collection device 61 has finished collecting $CO_2$, vehicle identification data, and identification data of the $CO_2$ collection location 6. The identification data of the $CO_2$ collection location 6 is set in advance for identifying the $CO_2$ collection location and is stored in the storage part 23 of the external device 2. Further, the processing part 24 of the external device 2 transfers the generated information communicating signal to the wireless communicating part 21 and makes the wireless communicating part 21 send the information communicating signal as a wireless signal from the wireless communicating part 21 to the server 3.

At step S35, the server processing part 33 judges if the received wireless signal (information communicating signal) contains data of the amount of $CO_2$ collection. The server processing part 33 proceeds to the processing of step S36 if the wireless signal contains data of the amount of $CO_2$ collection. On the other hand, the server processing part 33 ends the present processing if the wireless signal does not contain data of the amount of $CO_2$ collection.

At step S36, the server processing part 33 identifies the vehicle 10 which has sent the wireless signal as the originating vehicle based on the data on the amount of $CO_2$ collection and the vehicle identification data which had been contained in the wireless signal. Further, the server processing part 33 identifies the $CO_2$ collection location 6 at which the $CO_2$ of the originating vehicle is collected and the group operating the $CO_2$ collection location 6 based on the data on the amount of $CO_2$ collection and the identification data of the $CO_2$ collection location 6 which had been contained in the wireless signal.

At step S37, the server processing part 33 reads in a third management list and a fourth management list stored in the server storage part 32. The third management list is a list which describes added up the amounts of $CO_2$ recovery up to now of each group for each group. Further, the fourth management list is a list which describes added up the amounts of $CO_2$ recovery collected and recovered at each $CO_2$ collection location 6 up to now for each $CO_2$ collection location 6.

Further, the server processing part 33 adds the amount of $CO_2$ collection which had been contained in the received wireless signal to the amount of $CO_2$ recovery of the group identified at step S36 to update the third management list and stores the updated third management list in the server storage part 32. Further, the server processing part 33 adds the amount of $CO_2$ collection which had been contained in the received wireless signal to the amount of $CO_2$ recovery of the $CO_2$ collection location 6 identified at step S36 to update the fourth management list and stores the updated fourth management list in the server storage part 32.

External devices 2 according to the present embodiment explained above are installed at a plurality of $CO_2$ collection locations 6 for collecting $CO_2$ from the $CO_2$ recovery devices 1 and are configured to send the amounts of $CO_2$ recovery recovered by the vehicles 10 and collected at the $CO_2$ collection locations 6 to the server 3. Further, the server 3 is configured to add up and manage the amounts of $CO_2$ recovery sent from the external devices 2 for each $CO_2$ collection location 6 or for each group operating the $CO_2$ collection location.

Due to this, a business or other group can add up and manage the amounts of $CO_2$ collection taken out from the vehicles 10 at the $CO_2$ collection locations 6 which it operates all together, so it is possible to easily obtain a grasp of the amounts of $CO_2$ recovery recovered by all of the vehicles 10 which it operates. Further, it is possible to individually grasp the amounts of $CO_2$ collection of the $CO_2$ collection locations 6 which it operates.

Note that, in the present embodiment, as explained above, in the third management list, the total amounts of the amounts of $CO_2$ recovery recovered by the groups up to then were managed, but in place of this or separate from this, it is also possible to manage the total amounts of the amounts of $CO_2$ recovery recovered in a certain fixed time period. Further, in the fourth management list as well, similarly, it is also possible to manage the total amounts of the amounts of $CO_2$ recovery recovered in a certain fixed time period. Due to this, it is possible to obtain a grasp of the amounts of $CO_2$ recovery recovered in a certain fixed time period, so for example it is possible to compare the amounts of $CO_2$ recovery for the different time periods.

Further, in the present embodiment as well, like in the second embodiment, it is also possible to display information relating to the amounts of $CO_2$ recovery of a group to outside or inside a vehicle 10 which the group operates and possible to display the amounts of $CO_2$ recovery of the $CO_2$ collection locations 6 which a group operates to the inside and outside of vehicles associated with the $CO_2$ collection locations 6.

That is, it is possible to configure the server 3 so as to send the added up amount of $CO_2$ recovery added up for each $CO_2$ collection location 6 to the external device 2 of a vehicle 10 associated with the $CO_2$ collection location 6 or configure the server 3 so as to send the added up amount of $CO_2$ recovery added up for each group operating a $CO_2$ collection location 6 to the external device 2 of a vehicle 10 belonging to the group or configure the external device 2 so as to display the information relating to the added up amount of $CO_2$ recovery sent from the server 3 at the display part 25.

Above, embodiments of the present disclosure were explained, but the above embodiments only show some of the examples of application of the present disclosure. They are not meant to limit the technical scope of the present disclosure to the specific configurations of the above embodiments.

For example, in the above embodiments, a $CO_2$ recovery device 1 was mounted in a vehicle 10 provided with an internal combustion engine and the exhaust discharged from the internal combustion engine was introduced into the $CO_2$ recovery device 1 to recover the $CO_2$ in the exhaust. However, the disclosure is not limited to this. In electric vehicles not provided with internal combustion engines, for example, it is also possible to provide pumps at the gas flow passages 51 to introduce the atmosphere into the $CO_2$ recovery devices 1 and enable and enable $CO_2$ in the atmosphere to be recovered.

Further, in the third embodiment, the explanation was given showing the example of the $CO_2$ collection locations 6 being permanent $CO_2$ collection locations 6 such as branches of a group, but for example when temporary $CO_2$ collection locations 6 are set up due to special events etc., the temporary $CO_2$ collection locations 6 may also be temporarily treated as $CO_2$ collection locations 6 of a certain group or number of groups.

Further, in the third embodiment, the case may be considered where the vehicle 10 of a certain group as an exception have its $CO_2$ collected at a $CO_2$ collection location 6 of a separate group from the group to which it belongs. That is, at step S36 of the flow chart of the above-mentioned FIG. 11, the case may be considered where the group to which the originating vehicle belongs and the group operating the $CO_2$ collection location 6 at which the $CO_2$ of the originating vehicle is collected are separate groups. In such a case, as an exception, at step S37, it is also possible to add the amount of $CO_2$ collection contained in the received wireless signal to the amount of $CO_2$ recovery recovered up to then by the group to which the originating vehicle belongs.

The invention claimed is:

1. An information management system comprising:
a plurality of external devices able to send and receive information; and
a server configured to be able to communicate with the plurality of external devices, wherein
each external device of the plurality of external devices is mounted in a vehicle of a plurality of vehicles, each external device of the plurality of external devices is configured so as to send an amount of $CO_2$ recovery recovered by a $CO_2$ recovery device provided in the vehicle of the plurality of vehicles to the server,
the server is configured to
receive a signal sent from one external device of the plurality of external devices,
identify an originating vehicle in which the one external device of the plurality of vehicles is mounted,
manage a first list that includes a total amount of $CO_2$ recovery for each vehicle of the plurality of vehicles by adding the amount of $CO_2$ recovery recovered by the $CO_2$ recovery device in the originating vehicle sent from the one external device of the plurality of external devices,
determine if the originating vehicle belongs to a predetermined group of vehicles,
when the originating vehicle belongs to the predetermined group of vehicles, manage a second list that includes a total amount of $CO_2$ recovery for the predetermined group of vehicles by adding the amount of $CO_2$ recovery recovered by the $CO_2$ recovery device in the originating vehicle sent from the one external device of the plurality of external devices, and
send at least one of the total amount of $CO_2$ recovery of the originating vehicle from the first list and the total amount of $CO_2$ recovery of the predetermined group of vehicles from the second list to the one external device of the plurality of external devices mounted in the originating vehicle, and
each external device of the plurality of external devices is provided with a display part configured to display the information relating to the total amount of $CO_2$ recovery of the vehicle of the plurality of vehicles sent from the server or the total amount of $CO_2$ recovery of the predetermined group of vehicles to which the vehicle of the plurality of vehicles belongs sent from the server, the information being displayed inside or outside the vehicle of the plurality of vehicles.

2. An information management system comprising:
a plurality of external devices able to send and receive information; and
a server configured to be able to communicate with the plurality of external devices, wherein
each of the plurality of external devices is installed at a $CO_2$ collection location of a plurality of $CO_2$ collection locations, each external device of the plurality of external devices is configured to acquire the infoi nation including vehicle identification data of a vehicle and an amount of $CO_2$ recovery recovered by a $CO_2$ recovery device provided in the vehicle collected at the $CO_2$ collection location of the plurality of $CO_2$ collection locations, and to send the information to the server,
the server is configured to
receive a signal sent from one external device of the plurality of external devices, the signal including the information,
identify the $CO_2$ collection location in which the one external device of the plurality of external devices is installed which sent the signal, and identify the vehicle corresponding to the information sent by the one external device of the plurality of external devices installed at the identified $CO_2$ collection location,
manage a first list that includes a total amount of $CO_2$ recovery for a group operating the identified $CO_2$ collection location by adding the amount of $CO_2$ recovery recovered by the identified $CO_2$ collection recovery device sent from the one external device of the plurality of external devices,
manage a second list that includes a total amount of $CO_2$ recovery for each $CO_2$ collection location of the plurality of $CO_2$ collection locations by adding the amount of $CO_2$ recovery recovered by the identified $CO_2$ collection location recovery device sent from the one external device of the plurality of external devices, and
send at least one of the total amount of $CO_2$ recovery of the vehicle from the first list and the total amount of $CO_2$ recovery of a predetermined group of vehicles from the second list to the one external device of the plurality of external devices mounted in the vehicle, and
send at least one of the total amount of $CO_2$ recovery added up for the identified $CO_2$ collection location to the external device of the vehicle associated with the identified $CO_2$ collection location and the total amount of $CO_2$ recovery for the group operating the identified $CO_2$ collection location to the external device of the vehicle belonging to the group, the external device of the vehicle being separate from the plurality of external devices, and
the external device of the vehicle is provided with a display part configured to display the total amount of $CO_2$ recovery from at least one of the first list and second list sent from the server at the display part inside or outside of the vehicle.

* * * * *